United States Patent
Wei et al.

(10) Patent No.: US 9,277,447 B2
(45) Date of Patent: Mar. 1, 2016

(54) SHORTENED SUBFRAME FORMAT FOR FDD

(75) Inventors: Na Wei, Beijing (CN); Chunyan Gao, Beijing (CN); Haiming Wang, Beijing (CN); Wei Bai, Beijing (CN); Wei Hong, Beijing (CN); Jing Han, Beijing (CN)

(73) Assignee: Nokia Technologies Oy, Espoo (FI)

( * ) Notice: Subject to any disclaimer, the term of this patent is extended or adjusted under 35 U.S.C. 154(b) by 129 days.

(21) Appl. No.: 13/880,526

(22) PCT Filed: Oct. 20, 2010

(86) PCT No.: PCT/CN2010/077899
§ 371 (c)(1),
(2), (4) Date: Apr. 19, 2013

(87) PCT Pub. No.: WO2012/051756
PCT Pub. Date: Apr. 26, 2012

(65) Prior Publication Data
US 2013/0286907 A1  Oct. 31, 2013

(51) Int. Cl.
*H04W 28/06* (2009.01)
*H04L 5/00* (2006.01)
*H04W 28/08* (2009.01)

(52) U.S. Cl.
CPC .............. *H04W 28/06* (2013.01); *H04L 5/001* (2013.01); *H04L 5/0048* (2013.01); *H04W 28/08* (2013.01)

(58) Field of Classification Search
CPC .............. H04L 5/0007; H04L 5/0001; H04W 72/1289; H04W 72/0446; H04W 72/0453; H04B 7/2656; H04B 7/2615; H04J 2011/0009; H04J 2011/0013

USPC ......... 370/328, 329, 252, 254, 337, 344, 347, 370/436, 442, 478
See application file for complete search history.

(56) References Cited

U.S. PATENT DOCUMENTS

2008/0219229 A1* 9/2008 Zheng ........................... 370/338
2010/0080166 A1* 4/2010 Palanki et al. ................ 370/315

(Continued)

FOREIGN PATENT DOCUMENTS

CN         101754230 A     6/2010
EP         2 360 984 A1    8/2011

OTHER PUBLICATIONS

International Search Report for Application No. PCT/CN2010/077899 dated Jul. 28, 2011.

(Continued)

*Primary Examiner* — Xavier S. Wong
(74) *Attorney, Agent, or Firm* — Alston & Bird LLP

(57) ABSTRACT

A method includes determining one of a multiplicity of subframes in a resource space in which a shortened subframe is to be communicated. Each of the subframes has a predetermined number of symbol positions. The resource space includes the multiplicity of subframes. The method includes communicating the shortened subframe in the determined subframe. The shortened subframe has a multiplicity of active symbols at first symbol positions in the determined subframe and has a multiplicity of blanked symbols at second symbol positions in the determined subframe. In an embodiment, each of the subframes is a first subframe carried on subcarrier. The resource space corresponds to a special subframe in a frame including the special subframe and a multiplicity of second subframes. The special subframe and the plurality of second subframes are located in different timeslots. Apparatus, computer programs, and program products are also disclosed.

19 Claims, 14 Drawing Sheets

(56) References Cited

U.S. PATENT DOCUMENTS

| | | |
|---|---|---|
| 2010/0135272 A1 | 6/2010 | Dayal et al. |
| 2011/0310830 A1* | 12/2011 | Wu et al. ............... 370/329 |
| 2012/0106471 A1* | 5/2012 | Behravan et al. ............ 370/329 |
| 2012/0147794 A1* | 6/2012 | Chung ............ H04W 72/0406 370/280 |
| 2013/0121316 A1* | 5/2013 | Skov et al. ............... 370/336 |

OTHER PUBLICATIONS

MediaTek Inc., *Time Shifting and Almost Blank Subframe for Intercell Interference Coordination*, (R1-104547), 3GPP TSG/RAN WG1 #62 Madrid, Spain (Aug. 27, 2010) 8 pages.

* cited by examiner

| Shortened FDD downlink or uplink Subframe configuration | Downlink symbol length for Normal CP | Downlink symbol length for Extended CP |
|---|---|---|
| 0 | $6592 \cdot T_4$ | $7680 \cdot T_4$ |
| 1 | $19760 \cdot T_5$ | $20480 \cdot T_5$ |
| 2 | $21952 \cdot T_5$ | $23040 \cdot T_5$ |
| 3 | $24144 \cdot T_5$ | $25600 \cdot T_5$ |
| 4 | $26336 \cdot T_5$ | |

FIG. 6

SHORTENED SUBFRAME FORMAT FOR FDD

TECHNICAL FIELD

This invention relates generally to wireless transmission and, more specifically, relates to wireless transmission over subframes of communication frames.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

CA carrier aggregation
CC component carrier
DL downlink
DwPTS downlink pilot time slot
eNode B enhanced Node B (also, eNB)
FDD frequency division duplex
HetNet heterogeneous network
GHz giga-Hertz
GP guard period
LTE long term evolution
LTE-A long term evolution advanced
OFDM orthogonal frequency-division multiplexing
PCC primary component carrier
PDCCH physical downlink control channel
PDSCH physical downlink shared channel
PRB physical resource block
PSS primary synchronization signal
PUSCH physical uplink shared channel
Rel-8 Release 8
Rel-10 Release 10
SCC secondary component carrier
SC FDMA single carrier, frequency division multiple access
SF subframe
SSS secondary synchronization signal
TDD time division duplex
UE user equipment
UL uplink
UpPTS uplink pilot time slot In the communication system known as evolved UTRAN (E UTRAN, also referred to as UTRAN-LTE, E-UTRA or 3.9G), the LTE Release 8 (Rel-8) is completed, the LTE Release 9 (Rel-9) is being standardized, and the LTE Release 10 (Rel-10) is currently under development within the 3GPP. In LTE, the downlink access technique is OFDMA, and the uplink access technique is SC-FDMA, and these access techniques are expected to continue in LTE Release 10.

Further releases of 3GPP LTE are targeted towards future IMT-Advanced systems, referred to herein for convenience simply as LTE-Advanced (LTE-A) which is expected to be part of LTE Rel-10. LTE-A is expected to use a mix of local area and wide area optimization techniques to fulfill the ITU-R (International Telecommunication Union Radiocommunication Sector) requirements for IMT-Advanced (International Mobile Telecommunications-Advanced) while keeping backward compatibility with LTE Release 8. Topics that are included within the ongoing study item include bandwidth extensions beyond 20 MHz, relays, cooperative MIMO and multi-user MIMO, and single user MIMO on the uplink.

LTE-A aims to provide significantly enhanced services by means of higher data rate and lower latency with reduced cost. Carrier Aggregation (CA) is one of key technologies to improve the data rate. The basic idea of CA is that LTE-Advanced terminals supporting CA can receive/transmit on multiple component carriers (CC) at the same time, thus having support for large bandwidth. It has been agreed that up to 5 (five) CCs could be aggregated in LTE Rel-10 in both FDD and TDD systems.

In Rel-10, the current discussion is mainly about CA of either FDD-FDD systems or TDD-TDD systems. However, if one operator has both TDD and FDD bands, the CA scenario of TDD/FDD is likely to become relevant. This is likely to be considered in Rel-11 and further releases. By using TDD/FDD CA, one can achieve some valuable benefits such as: balancing the traffic load among FDD and TDD systems, improving the peak data rate, and thus improving the spectrum efficiency in general for the operator.

In Germany, the government had an LTE spectrum auction this year for the 2.6 GHz spectrum. After the auction, the FDD UL/DL and TDD band is shared by four operators in a discontinuous manner. In the TDD spectrum, there is a very high chance some operators will operate with TDD system, but may still wish to support FDD UEs in case load is low in TDD system, especially in the early phase of implementation. On the other hand, an operator may also wish to have the flexibility of support TDD UE in FDD system in case of load balancing, or to improve peak data rate.

BRIEF SUMMARY

In an exemplary aspect of the invention there is a method, comprising determining one of a plurality of subframes in a resource space in which a shortened subframe is to be communicated, each of the subframes having a predetermined number of symbol positions, the resource space comprising the plurality of subframes, and communicating the shortened subframe in the determined subframe, the shortened subframe having a plurality of active symbols at first symbol positions in the determined subframe and having a plurality of blanked symbols at second symbol positions in the determined subframe.

In another exemplary embodiment of the invention there is an apparatus, comprising at least one processor, and at least one memory including computer program code, the at least one memory and the computer program code configured to, with the at least one processor, cause the apparatus to at least determine one of a plurality of subframes in a resource space in which a shortened subframe is to be communicated, each of the subframes having a predetermined number of symbol positions, the resource space comprising the plurality of subframes, and communicate the shortened subframe in the determined subframe, the shortened subframe having a plurality of active symbols at first symbol positions in the determined subframe and having a plurality of blanked symbols at second symbol positions in the determined subframe.

In a further exemplary embodiment of the invention there is a method comprising receiving a shortened subframe in a determined subframe, the shortened subframe having a plurality of active symbols at first symbol positions in a determined subframe and having a plurality of blanked symbols at second symbol positions in the determined subframe, and decoding the active symbols based on the received shortened subframe having the plurality of active symbols at the first symbol positions and having the plurality of blanked symbols at the second symbol positions.

In yet another exemplary embodiment of the invention there is an apparatus comprising at least one processor, and at least one memory including computer program code, the at least one memory and the computer program code configured to, with the at least one processor, cause the apparatus to receive a shortened subframe in a determined subframe, the shortened subframe having a plurality of active symbols at first symbol positions in a determined subframe and having a plurality of blanked symbols at second symbol positions in the determined subframe; and decode the active symbols based on the received shortened subframe having the plurality of active symbols at the first symbol positions and having the plurality of blanked symbols at the second symbol positions.

BRIEF DESCRIPTION OF THE DRAWINGS

The foregoing and other aspects of embodiments of this invention are made more evident in the following Detailed Description of Exemplary Embodiments, when read in conjunction with the attached Drawing Figures, wherein:

FIG. 6 is a table illustrating exemplary configurations for shortened downlink subframes for FDD.

DETAILED DESCRIPTION OF THE DRAWINGS

Figure 1:
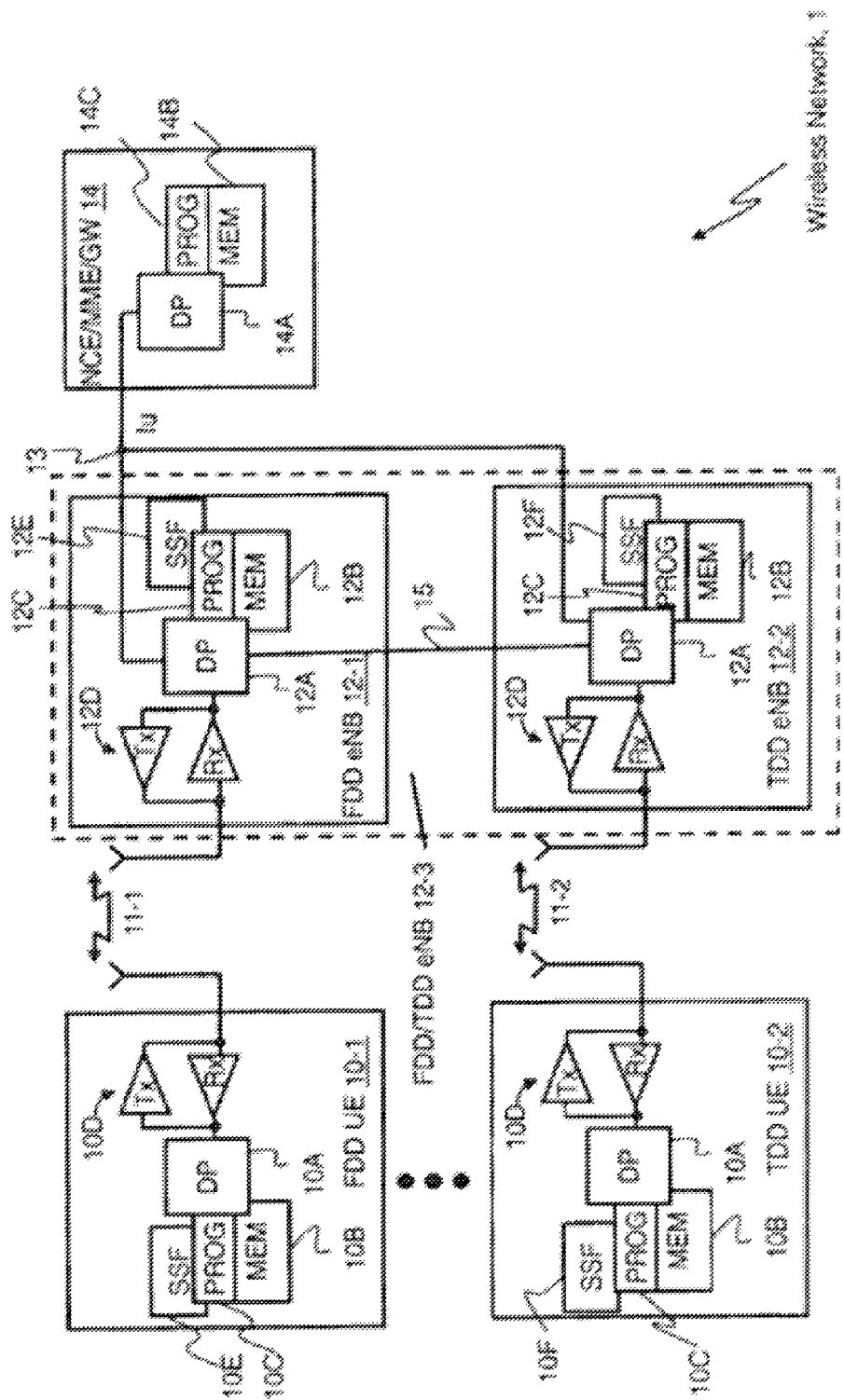
FIG. 1 is a simplified block diagram of various electronic devices and apparatus that are suitable for use in practicing exemplary embodiments of this invention.

As described above, there will likely be reasons for an operator to support both FDD and TDD UEs. Before proceeding with additional description regarding problems in this area and proposed exemplary solutions herein, it is helpful to first examine an exemplary wireless network in which exemplary embodiments of the instant invention may operate. FIG. 1 is a simplified block diagram of various electronic devices and apparatus that are suitable for use in practicing exemplary embodiments of this invention. In FIG. 1, a wireless network 1 shows a first communication occurring over a wireless link 11-1 with an apparatus, such as a mobile communication device which above is referred to as a UE 10-1, via a network access node, such as a base station, and more specifically an eNodeB (eNB, an enhanced Node B) 12-1. This first communication uses FDD, and therefore the UE 10-1 is labeled as "FDD UE 10-1" and the eNB 12-1 as "FDD eNB 12-1" for ease of exposition. A second communication is shown occurring over a wireless link 11-2 with an apparatus, such as a mobile communication device which above is referred to as a UE 10-2, via a network access node, such as a base station, and more specifically the eNB 12-2. The second communication uses TDD, and therefore the UE 10-2 is labeled as "TDD UE 10-2" and the eNB 12-2 as "TDD eNB 12-2", again for ease of exposition.

It is noted that there will typically be multiple FDD UEs 10-1 and multiple TDD UEs 10-2, but only two are shown. It may also be possible for a single UE to use both FDD and TDD at the same time. Additionally, in an exemplary embodiment the eNB 12-1 and 12-2 can communicate using (e.g., data, control or both) path 15 in order to perform the actions described as being performed by the eNBs herein. In another exemplary embodiment, the FDD eNB 12-1 and the TDD eNB 12-2 are combined into a single FDD/TDD eNB 12-3.

The network 1 may include a network control element (NCE) 14 that may include mobility entity/serving gateway MME/S-GW functionality, and which provides connectivity with a network, such as a telephone network and/or a data communications network (e.g., the Internet).

Each of the UEs 10 includes a controller, such as a computer or a data processor (DP) 10A, a computer-readable memory medium embodied as a memory (MEM) 10B that stores a program of computer instructions (PROG) 10C, and a suitable radio frequency (RF) transceiver 10D for bidirectional wireless communications with the eNB 12 via one or more antennas. Each eNodeB 12 also includes a controller, such as a computer or a data processor (DP) 12A, a computer-readable memory medium embodied as a memory (MEM) 12B that stores a program of computer instructions (PROG) 12C, and a suitable RF transceiver 12D for communication with the UE 10 via one or more antennas. The eNodeB 12 is coupled via a (data or control or both) path 13 to the NCE 14, such as for example an S1 interface.

At least one of the PROGs 10C and 12C is assumed to include program instructions that, when executed by the associated DP, enable the device to operate in accordance with exemplary embodiments of this invention. That is, the exemplary embodiments of this invention may be implemented at least in part by computer software executable by the DP 10A of a UE 10 and/or by the DP 12A of an eNB 12, or by hardware, or by a combination of software and hardware (and firmware).

In the example of FIG. 1, it is assumed that the FDD UE 10-1 has an instruction portion SSF (shortened subframe format) 10E as part of PROG 10C, the TDD UE 10-2 has an instruction portion SSF 10F as part of PROG 10C, the FDD eNB 12-1 has an instruction portion SSF 12E as part of PROG 12C, and the TDD eNB 12-2 has an instruction portion SSF 12F as part of PROG 12C. Each of the instruction portions are executed by the corresponding one of the data processors 10A or 12A and cause the corresponding apparatus 10 or 12 to perform one or more operations defined herein for shortened subframe format for FDD. It is noted that software is executed by an associated DP in order to cause operations to be carried out by a UE or an eNB.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multicore processor architecture, as non-limiting examples.

Figures 2, 3:
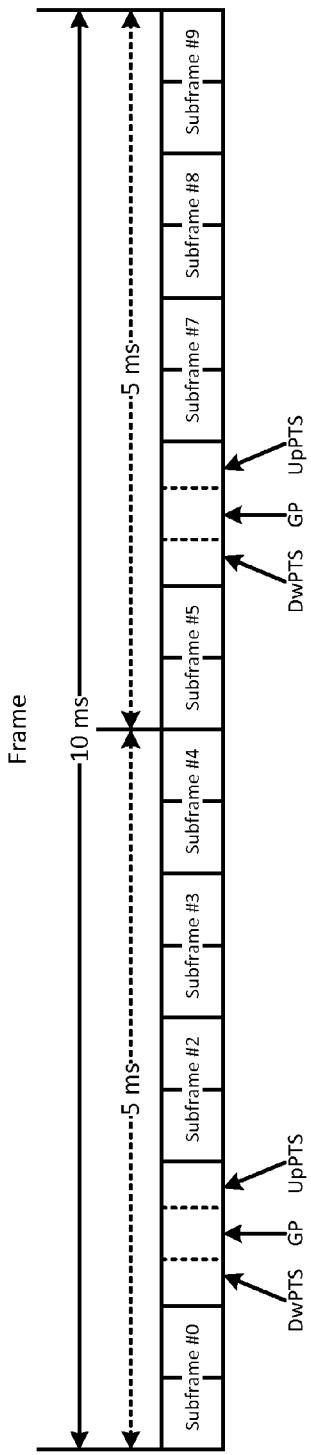
FIG. 2 illustrates a TDD frame structure (for 5 ms switch-point periodicity).
FIG. 3 is a table illustrating the configuration of special subframe (lengths of DwPTS/GP/UpPTS) for TDD frame structure.

Turning now to information regarding LTE TDD, in an LTE TDD frame structure, there is one special subframe (SF), which uses quite a different symbol structure as compared to the normal SF. The special SF is split into three parts: a DL part (DwPTS), a guard period (GP), and an UL part (UpPTS). The GP is used to provide the necessary guard time for DL-to-UL switching. In TDD, the downlink may be silent before any UE can transmit in uplink. Further, depending on cell size, the needed duration of the GP varies. For example, a UE in a cell edge may transmit earlier than others, such as in the middle of a GP period, so its uplink signal may arrive at same time as another UE. The GP may include, in total, the largest propagation delay for a DL signal and DL hardware DL, and may be, for example, greater than a delay for an UL switch and UL signal. Additionally, the random-access preamble format 4 and Sounding Reference Signal (SRS) can be transmitted in the UpPTS field of the special SF. FIG. 2 shows an example for TDD configuration with special SFs in subframes one and six of a frame. The configuration of the special subframes for TDD is also shown in FIG. 3. As shown, there are various lengths for DwPTS, Guard period (GP), and UpPTS.

Figure 4:
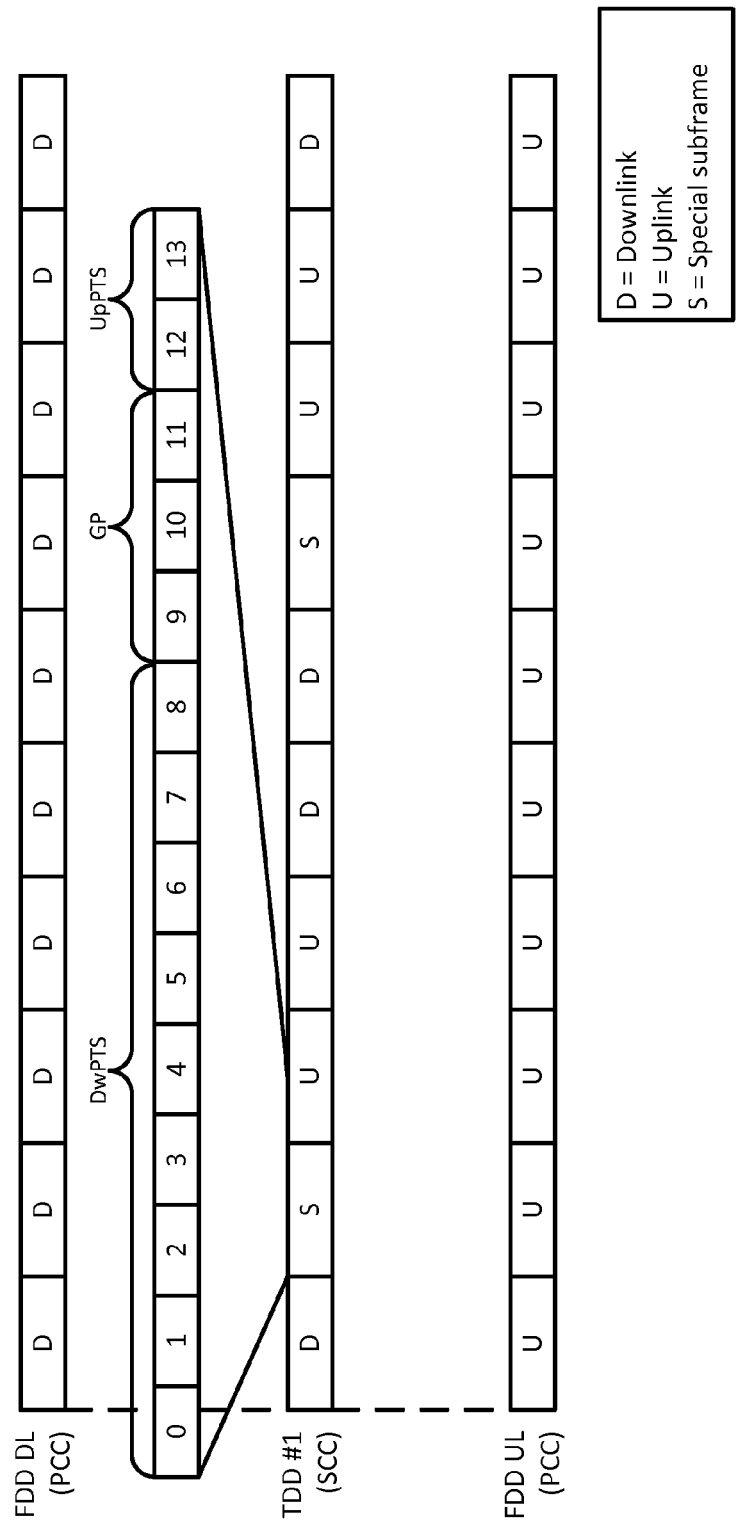
FIG. 4 illustrates an FDD TDD CA scenario for FDD CC is PCC.

FIG. 4 illustrates an FDD TDD CA scenario for FDD UE where FDD CC is PCC. FIG. 4 shows an example of how to support FDD UE in TDD CC, and is used to illustrate certain problems with this scenario. The FDD UE will have an FDD carrier as a Primary CC (PCC), and an TDD carrier as a Secondary CC (SCC). Then the FDD UE can potentially use the downlink resources from TDD carrier, while the TDD UE can still operate normally in TDD carrier. As shown, it is relatively easy to deploy FDD UE in DL subframe of TDD CC, which is shown as "D" (downlink) blocks in TDD CC, as long as the FDD and TDD CC are operated with aligned timing.

However, there is a problem for the FDD UE when the FDD UE attempts to access the DwPTS, which is the downlink part of the special subframe ("S" blocks). With current fixed normal length FDD PDSCH format from Rel-8/10, FDD PDSCH communications will generate/receive undesired interference to/from TDD UE or neighbor CC if applied directly to the symbol positions beyond DwPTS positions, since the TDD UE might need to utilize the UpPTS and GP symbol positions in the special subframe. That is, there will be interference caused by simultaneous transmission by an FDD eNB 12-1 to an FDD UE 10-1 in symbol positions 9-11 (dedicated to GP) and/or symbol positions 12 and 13 (dedicated to UpPTS), if the TDD UE 10-2 is transmitting the UpPTS to the TDD eNB 12-2.

On the other hand, quite a few downlink resources will be wasted if FDD UEs 10-1 are not allowed to utilize the DwPTS part (symbol positions 0-8, zero to eight) of the special subframe. In the example shown with TDD configuration one (1), the total possible DL resource from TDD carrier is two downlink subframes and one DwPTS in one half frame, therefore, up to 30 percent of the downlink resources will be wasted for FDD UE if not able to utilize the DwPTS part. More specifically, this calculation includes the waste portion for the total DL resource. In a half frame, there are two DL subframes and one special subframe with DwPTS in TDD configuration 1, so the waste should be 26336/(26336+2*30720)=30 percent (here, 26336 is the maximum for DwPTS from the table in FIG. 3).

Figure 5:
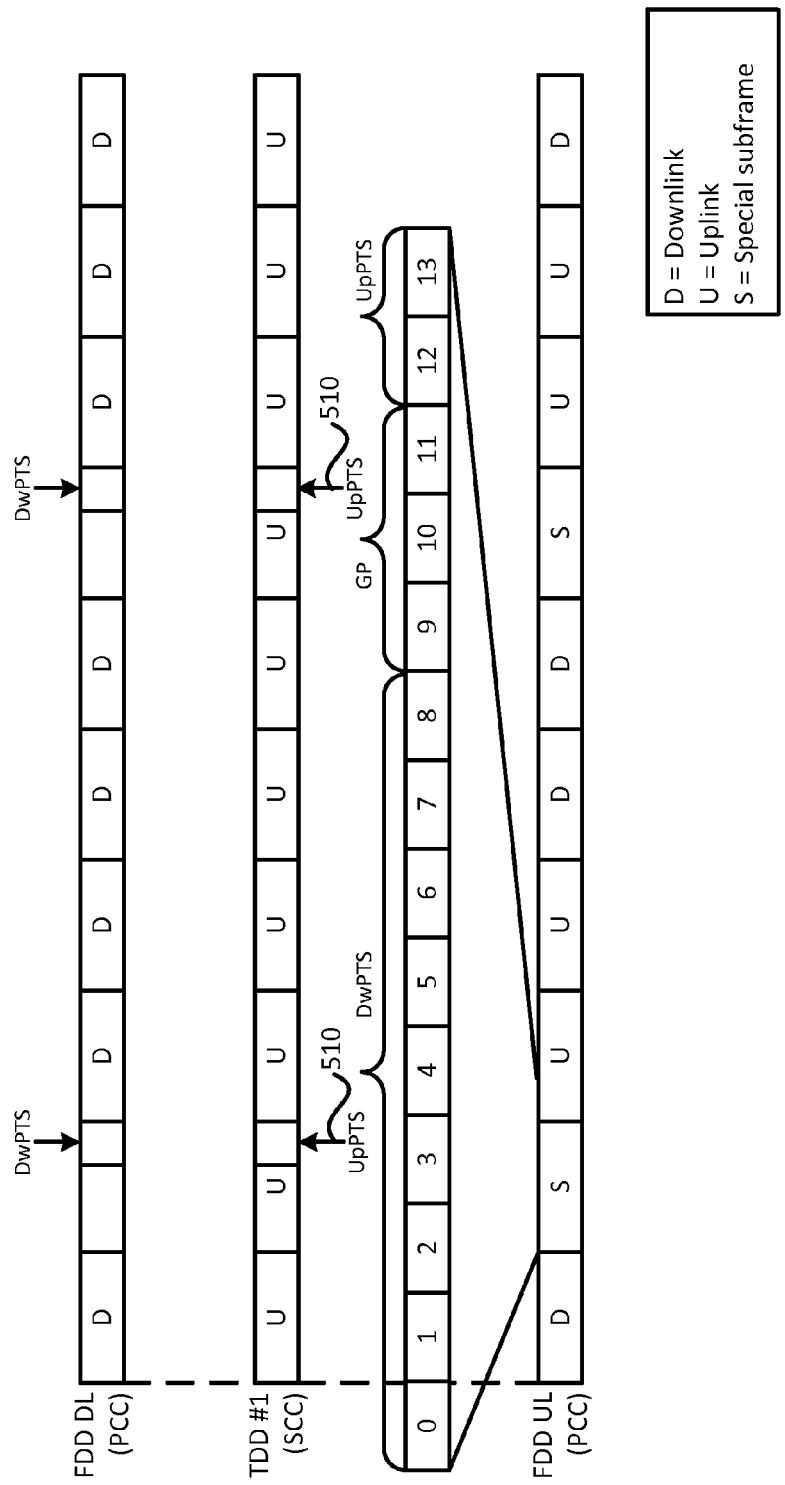
FIG. 5 illustrates an implementation of an FDD TDD CA scenario for an TDD UE where TDD CC is PCC.

Referring now to FIG. 5, this figure illustrates an implementation of an FDD TDD CA scenario for TDD UE where TDD CC is PCC. This figure illustrates an example of how to support TDD UE in FDD CC. The TDD UE will have TDD carrier as PCC, and FDD carrier as SCC. The TDD UE can use the downlink resources from FDD DL carrier, or/and use the uplink resources from FDD UL carrier, while the FDD UE can still operate normally in FDD carrier. The TDD UE can potentially utilize UpPTS in FDD UL CC as well, as shown in block 510, in the FDD UL CC. In the case of a single symbol UpPTS, one solution is to configure this subframe as an SRS subframe for FDD UEs, then FDD UE will transmit shortened PUSCH format in that UL subframe. It is noted that according to Rel-8 a UL subframe can transmit SRS for FDD, by which the last symbol of that subframe will be reserved for SRS transmission. In this case, a PUCCH/PUSCH for an FDD UE may be shortened by 1 symbol.

However, there is no such solution for the case when the TDD UE needs to transmit SRS in one (e.g., the first) or both symbols of the two symbol length UpPTS (see symbol positions 12 and 13 of the special subframe), or when TDD UE needs to transmit short PRACH in UpPTS, which needs two UL symbols (see symbol positions 12 and 13 of the special subframe). The exemplary embodiments of the invention provide at least a method and apparatus to support TDD UE's UpPTS in a last symbol of that FDD UL subframe. Thus, all FDD UEs can use a shortened subframe and additionally use that resource for a TDD UE UpPTS.

There currently are no solutions known to the inventors to the problems described above with respect to FIGS. 4 and 5. Exemplary embodiments herein provide solutions to these problems.

In particular, relative to the problems described above for FIGS. 4 and 5, a shortened downlink subframe format is presented. More particularly, to solve the problems mentioned above in FIG. 4 for an FDD TDD CA scenario for FDD UE where FDD is PCC and TDD is SCC, a new definition is proposed for a shortened downlink subframe format for FDD UE. By this new definition, the downlink symbol length for FDD UE can be flexibly configured, may have a length from one (1) to 12 symbols for a normal cyclic prefix (CP) case, or from one (1) to 10 symbols for an extended CP case. The table shown in FIG. 6 gives one example of potential downlink subframe configurations if reuse of the TDD DwPTS configurations setting is possible. In addition, the above described puncture approach may be used for some cases. Further, in certain cases, a re-position of a reference signal (RS) may be necessary in addition to puncture.

Additionally, the proposed shortened downlink subframe format might also useful for FDD TDD CA in Hetnet scenarios. In case there is co-existence with a macro cell which uses long guard period (GP) in a TDD system to support large coverage, the femto cell can utilize FDD shortened downlink subframe format in the special subframe, which can be flexibly configured to make some unnecessary part of the GP useful for downlink transmissions as well. This is explained in more detail below in reference to FIG. 11.

When the FDD UE receives a shortened downlink subframe configuration index (e.g., indicative of one of the shortened FDD downlink subframe configurations 0-4, zero to four, shown in FIG. 6) and the subframe number index (e.g., indicative of a subframe in a resource space, as described below in reference to FIG. 8) where the configuration is applied, from RRC signaling or other command messages, the FDD UE will decode the downlink subframe assuming the shortened subframe format.

To solve the problems mentioned above with respect to FIG. 5 for the FDD TDD CA scenario for TDD UE where TDD is PCC, a new definition is proposed for a shortened uplink subframe format for FDD UE. By this new definition, the uplink PUSCH and PUCCH symbol length for FDD UE can be flexibly configured, may have a length from one (1) to 13 symbols for a normal cyclic prefix (CP) case, or from one (1) to 11 symbols for an extended CP case. A similar table as shown in FIG. 6 can be defined for the shortened uplink subframe format.

When the FDD UE receives a shortened uplink subframe configuration index and the subframe number index (e.g., indicative of a subframe in a resource space, as described below in reference to FIG. 10) where the configuration is applied, from RRC signaling or other command messages, the FDD UE will form the uplink subframe assuming the shortened subframe format. Additionally, all uplink channels and demodulation reference signal (DM-RS) on that uplink subframe will be "punctured" on the blanked symbols for FDD UE (that allows the TDD UE transmits in the blanked symbol positions). It is also possible to reposition the DM-RS within the shortened PUCCH format instead of just puncturing in order to support intra-subframe hopping on PUCCH. Similarly, it is also possible to reposition the DM-RS within the shortened PUSCH format instead of just puncturing in order to improve demodulation performance in case DM-RS symbol is punctured.

Figure 7:
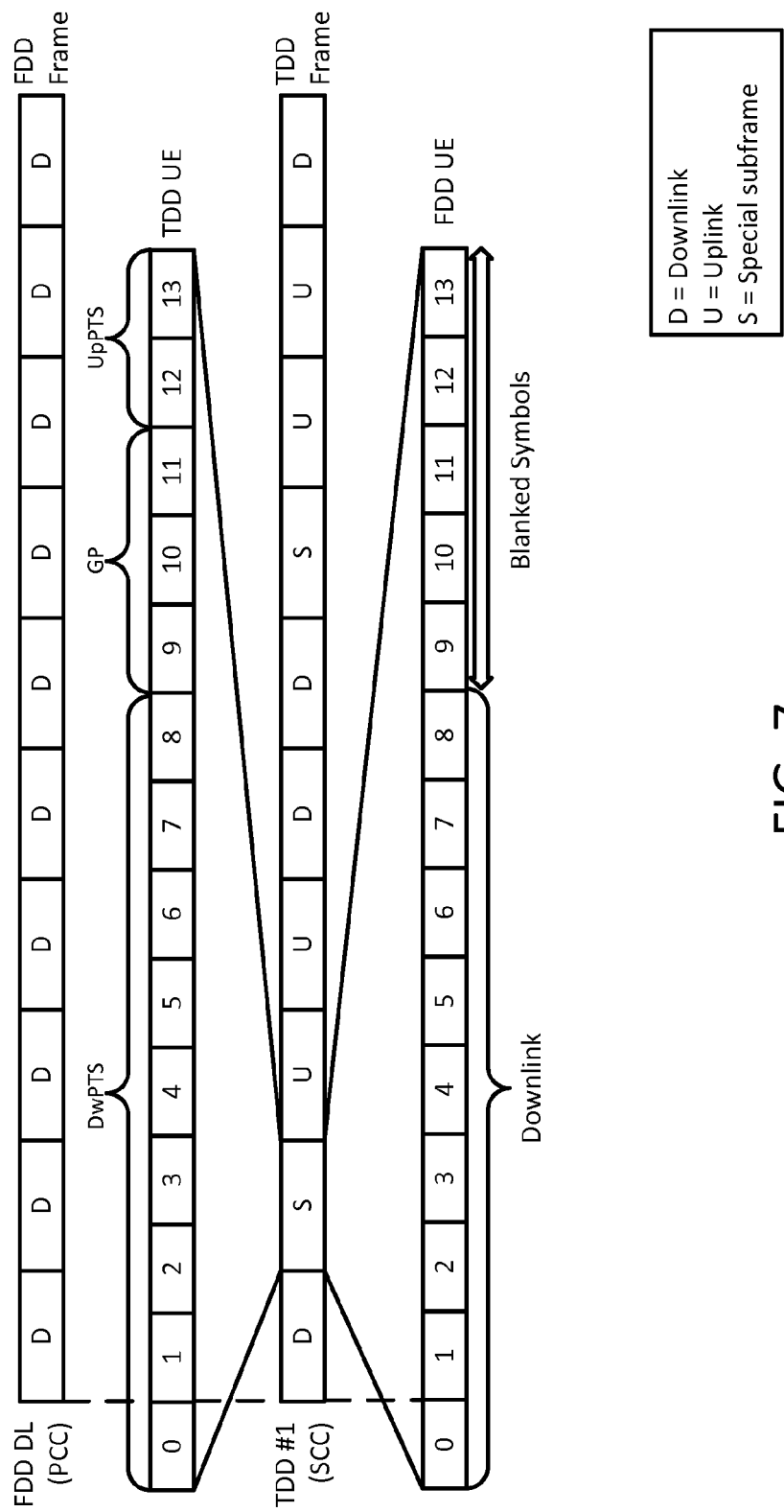
FIG. 7 illustrates a scenario where an FDD UE shares the special subframe with a TDD UE, illustrated using FDD and TDD frames.

Regarding an implementation of FDD TDD CA scenario for FDD UE where FDD is PCC, and TDD is SCC, FIG. 7 illustrates a scenario where an FDD UE shares the special subframe with a TDD UE. FDD and TDD frames are shown, and each of these frames includes a number of subframes assigned different timeslots. The FDD UE can use a normal downlink format to access the downlink subframe of SCC (TDD CC) via eNB scheduling (marked as "D"). Alternatively, FDD UE may use normal uplink format to access the uplink subframe of SCC (marked as "U"). To support FDD/TDD CA, concerned FDD and TDD carriers need tight synchronization. However, this is the same requirement as in normal CA operation.

Figure 8:
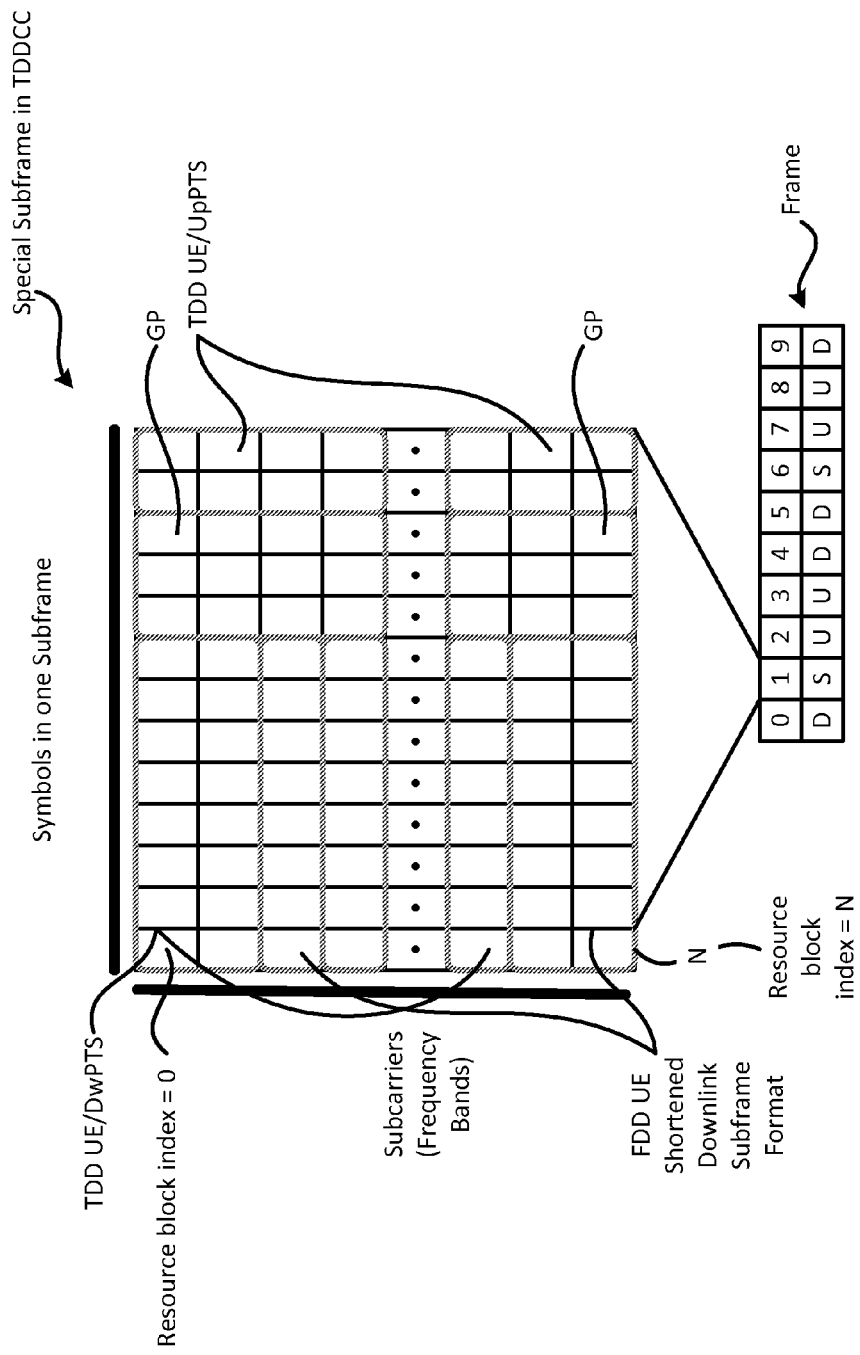
FIG. 8 illustrates an implementation of a resource space and corresponding frame for an FDD TDD CA scenario for a TDD UE where TDD is PCC.

Referring to FIG. 8, FIG. 8 illustrates an implementation of a resource space and corresponding frame for an FDD TDD CA scenario for FDD UE where FDD CC is the PCC and TDD CC is the SCC. FIG. 8 illustrates resource blocks in one subframe in TDD CC and each row has a number of symbol positions (0-13) in which resource elements (e.g., symbols) may be communicated. Each column is associated with a resource block index, from zero (0) to N in this example. FIG. 8 shows detail on the special subframe duration (marked as "S", where "D" is downlink and "U" is uplink) which is where this invention concentrates although the invention is not limited thereto. As shown, in the special subframe of TDD SCC, there may be simultaneous transmissions to/from both TDD UE and FDD UE, depending on the eNB scheduling. The DwPTS may be transmitted on symbol positions 0-8 from the TDD eNB to TDD UE, and the TDD UE may transmit UpPTS signal to TDD eNB on symbol positions 12 and 13. FIG. 8 illustrates downlink resource blocks in a TDD carrier. The resource can be sent to either multiple TDD UEs or multiple FDD UEs depending on the scheduling information. The FDD UE may only use a DL part of a TDD CC, but it may have simultaneous DL and/or UL transmission in an FDD DL and/or UL CC.

With consideration of FDD UE's possible interference to TDD UE if using the normal downlink format, the new downlink special subframe format for FDD UE is designed as reserving symbol positions 0-8 for downlink transmission using active symbols and by blanking symbol positions 9-13 to avoid interference to the TDD UE's UpPTS signal transmission. An "active" symbol is a symbol where information is transmitted on that symbol (and the information may be data, control, and the like). "Blanking" a symbol position (or the corresponding symbol) means that nothing is transmitted in that symbol position (or on the corresponding symbol). Blanked symbol positions 9-13 can then be used for other TDD UE's transmitting UpPTS. This way, the resources in the special subframe are fully utilized. The FDD shortened downlink format may reuse current TDD format/configuration for symbol positions 0-8. The FDD or TDD eNB is a virtual concept, as just one eNB may physically handle all the operations, depending on implementation.

Figure 9:
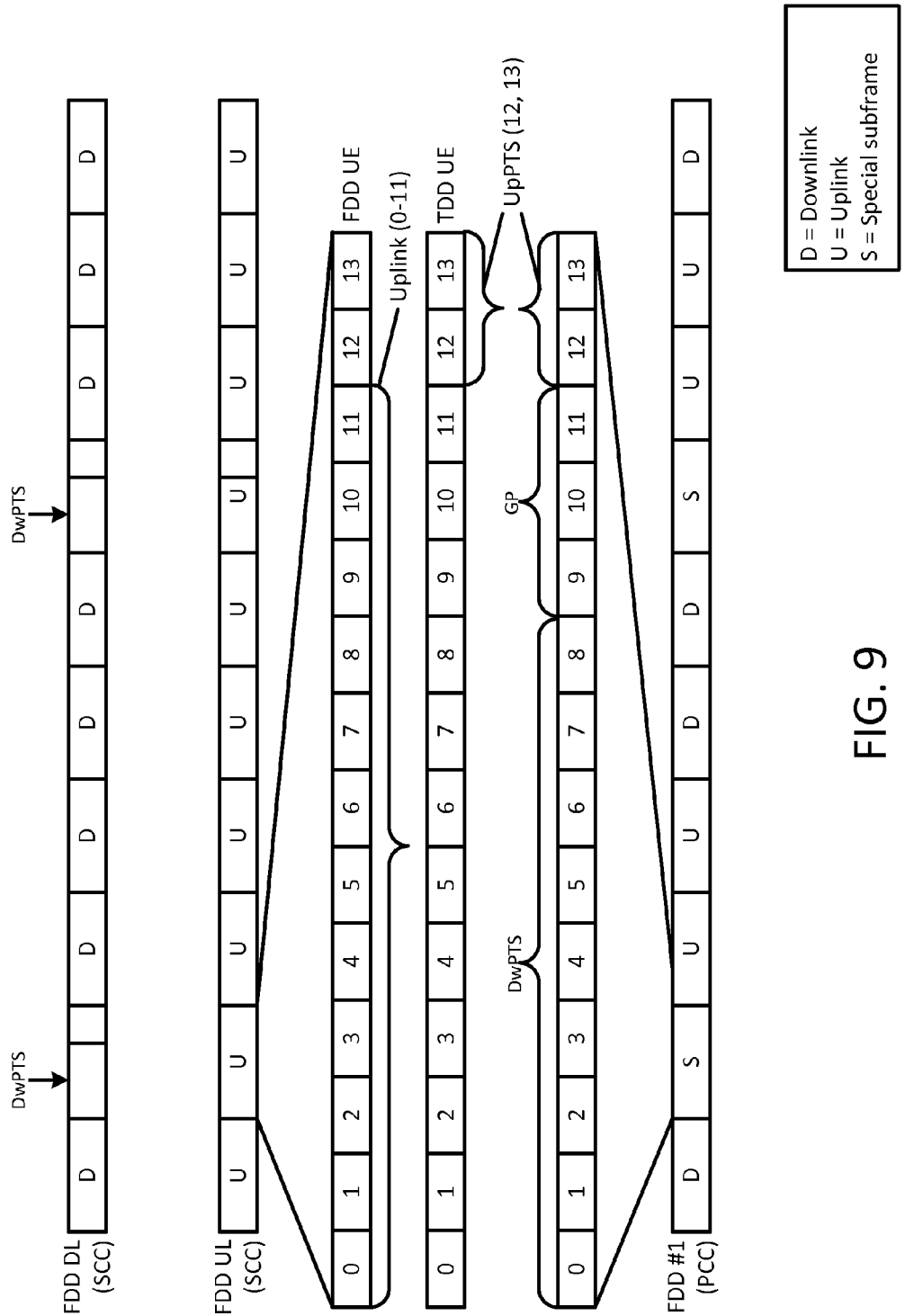
FIG. 9 illustrates another scenario where an FDD UE shares the special subframe with a TDD UE.

Regarding an implementation of an FDD TDD CA scenario for TDD UE where TDD is PCC, FIG. 9 gives one example of such an implementation, where TDD is PCC, and FDD is SCC. The TDD UE can use normal downlink format to access the downlink subframe of SCC (FDD DL CC) via eNB scheduling (marked as "D" in FDD DL), or DwPTS format to access downlink subframe 1/6 (marked as "DwPTS" in FDD DL SCC). Similarly, the TDD UE can also use normal uplink format to access the uplink resource from SCC (FDD UL SCC) via eNB scheduling (marked as "U" or "uplink" in FDD UL). To support FDD/TDD CA, concerned FDD and TDD carriers need tight synchronization. However, this is the same requirement as in normal CA operation.

Figure 10:
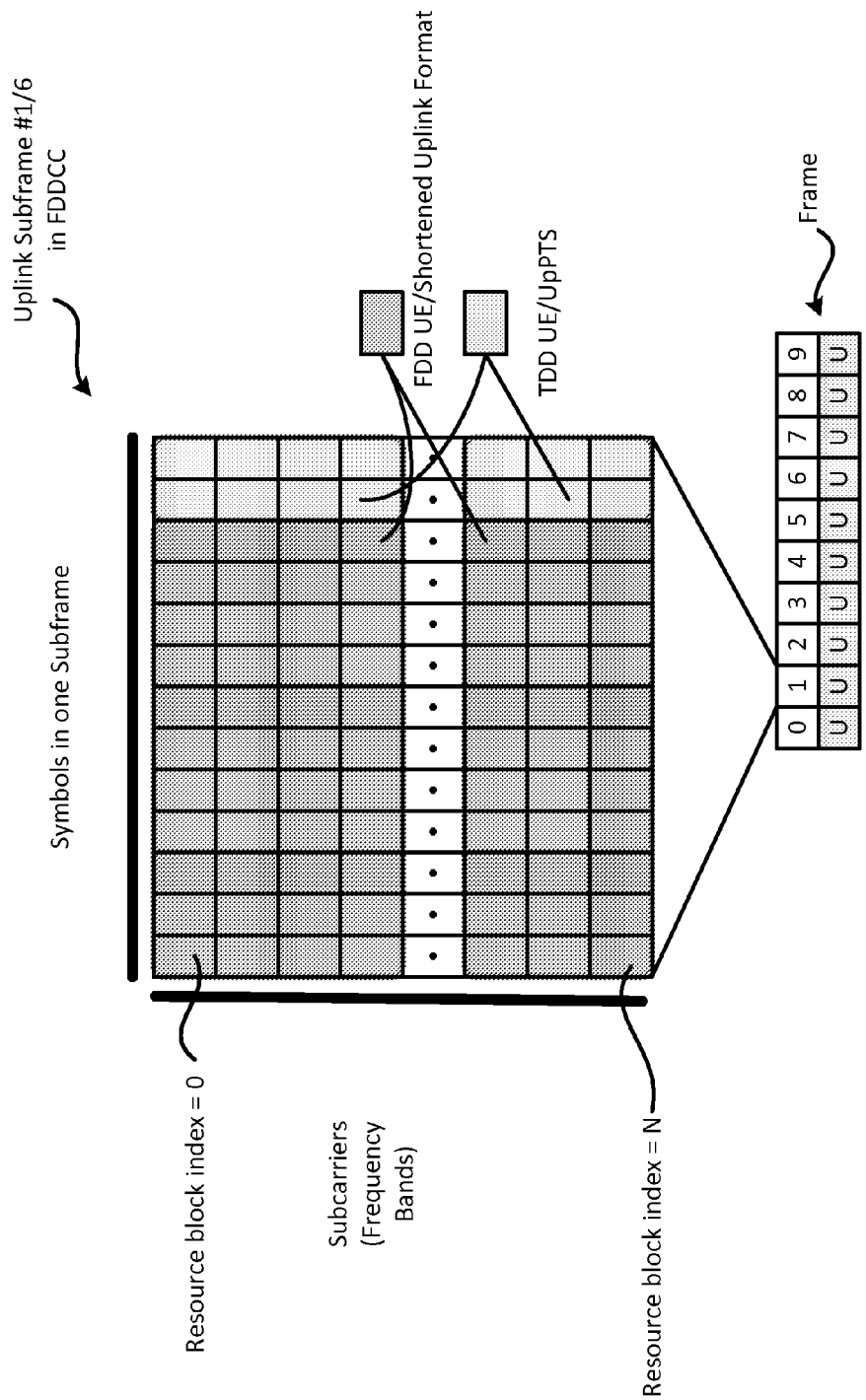
FIG. 10 illustrates a resource and corresponding frame where a TDD UE uses UpPTS in the uplink subframe of an FDD carrier.

Turning to FIG. 10, this figure shows detail on an uplink subframe 1/6 of an FDD carrier, which corresponds to the special subframe duration of the TDD UE. The resource space in this example is two resource blocks and each row has a number of symbol positions (0-13) in which resource elements (e.g., symbols) may be communicated. Each column is associated with are source block index, from zero (0) to N in this example. As shown, there may be simultaneous transmission between TDD UE and FDD UE. Uplink may be transmitted from FDD UE to FDD eNB, and TDD UE may wish to transmit UpPTS to TDD eNB on symbol positions 12 and 13.

With consideration of FDD UE's possible interference to the TDD UE and vice versa, a new uplink special subframe format for FDD UE is designed as symbol positions 0-11 are reserved for uplink transmission of active symbols and symbol positions 12 and 13 are reserved for blank symbols (i.e., nothing transmitted on the symbol positions from FDD UE) to avoid interference to potential TDD UE's uplink UpPTS signal transmission. Blanked symbol positions 12 and 13 (and their corresponding symbols) can then be used for TDD UE's transmitting UpPTS for, e.g., either a RACH or a SRS purpose. The FDD shortened uplink format may use the normal uplink format but not transmit active symbols in symbol positions 12 and 13 in FDD PUCCH/PUSCH. As described above, the FDD or TDD eNB is a virtual concept, and one eNB may physically handle all the operations.

Figure 11:
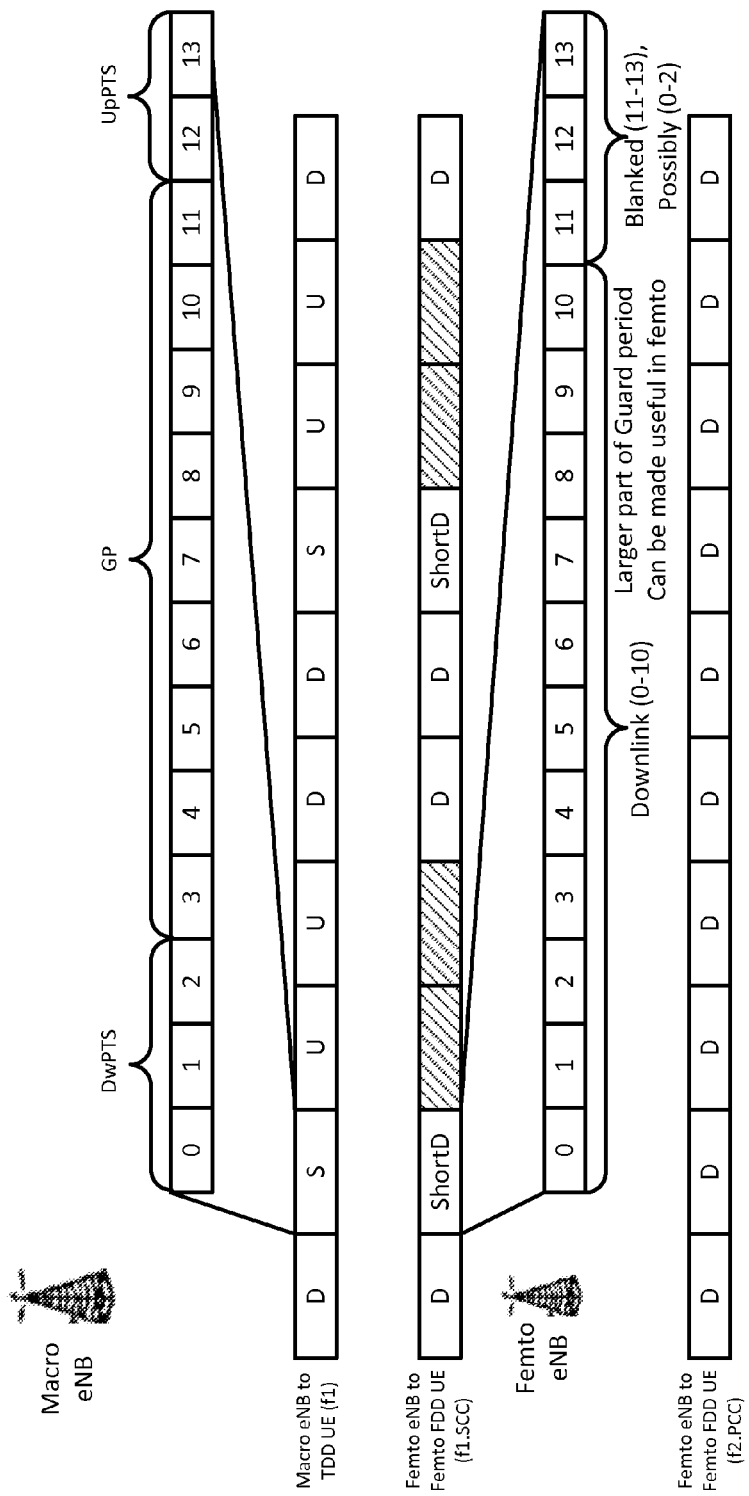
FIG. 11 illustrates an implementation of an FDD TDD CA scenario for FDD UE where FDD is PCC in HetNet.

With respect to an implementation of an FDD TDD CA scenario for FDD UE where FDD is PCC in HetNet, FIG. 11 illustrates an implementation of this scenario. That is, FIG. 11 gives one example of an implementation of FDD shortened downlink format with a length of 11 downlink symbols (i.e., 11 symbol positions). Here, the Macro eNB and Femto eNB are operating on the same frequency. The Macro eNB is utilizing a TDD system and is operated with a very short DwPTS of three symbols to improve coverage. The Femto is utilizing the FDD system, but only for DL subframes of Macro TDD system to avoid interference. With a flexible PDSCH length, the FDD UE can be configured to use more downlink resources from GP, which otherwise will be wasted. There is also possible implementation of a shortened PDSCH only in the GP part (symbol positions 3-11, as illustrated by the "larger part of guard period can be made useful in femto"), where more important control information can be transmitted over the femto cell air interface while the macro cell is under a guard period.

Figure 12:
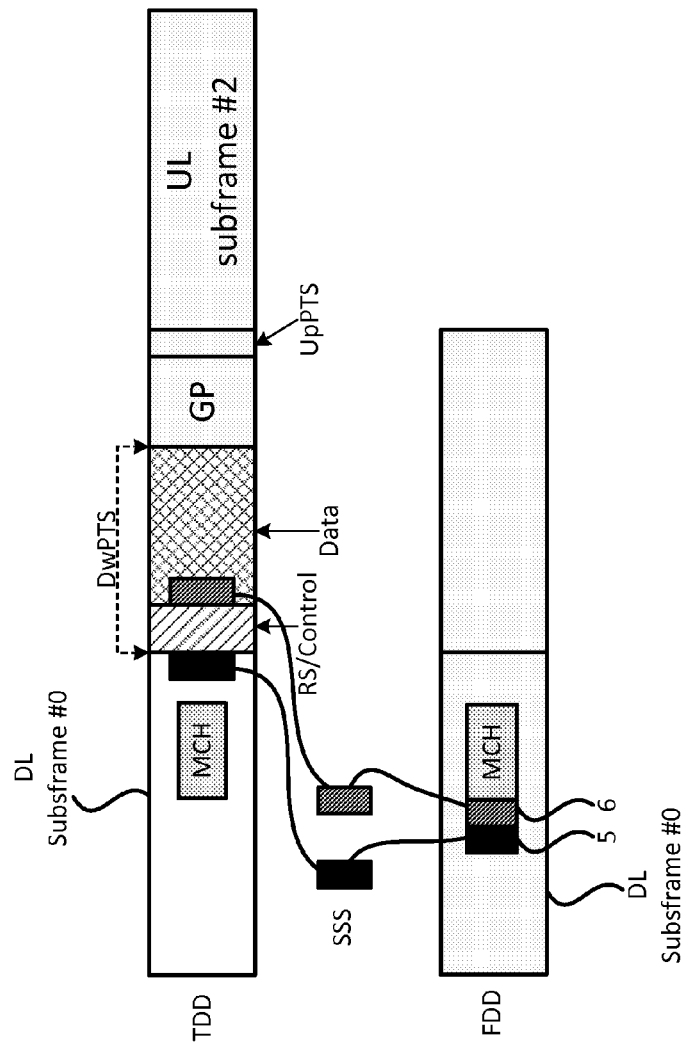
FIG. 12 illustrates differences in PSS/SSS positions in LTE FDD and TDD.

It is noted that in accordance with an embodiment of the invention, in special subframe downlink transmission, each resource block may cover one or more shortened symbols over time and one or more subcarriers over frequency. Further, a TDD UE or an FDD UE may be scheduled to receive on some resource blocks. In addition, other symbols in this subframe maybe used by TDD UE for GP or UpPTS Regarding an implementation of a potential SSS/PSS collision with data, an example of this is shown in FIG. 12. As shown in FIG. 12, the SSS/PSS is located differently in the FDD and TDD systems. In the case that FDD UE is accessing a TDD carrier which also supports other TDD UEs, the FDD UE will assume data is in the TDD carrier's PSS position within the shortened format FDD DL. If the center six PRBs (physical resource blocks) are allocated, the FDD UE will incorrectly include PSS as data before decoding.

To solve this potential collision, one solution is to put a constraint in the eNB so that the scheduler does not allocate the center six PRBs to FDD UEs in the special subframe in this scenario. Another solution is to always define a void PSS resource in the case of a shortened FDD subframe when used in special subframe. A similar solution may also be used in the Subframe 0 (zero) in order to avoid detection errors. It is noted that a PRB is a small scheduling resource. Generally, the FRB is 12 subcarrier x N_DL_symbols, and, for a normal subframe, the x N_DL_symbols is 14. It is noted that with regards to FIG. 7 and FIG. 8, there are illustrated a few PRBs scheduled to a FDD UE, and some of the PRBs are scheduled to a TDD UE.

Figure 13:
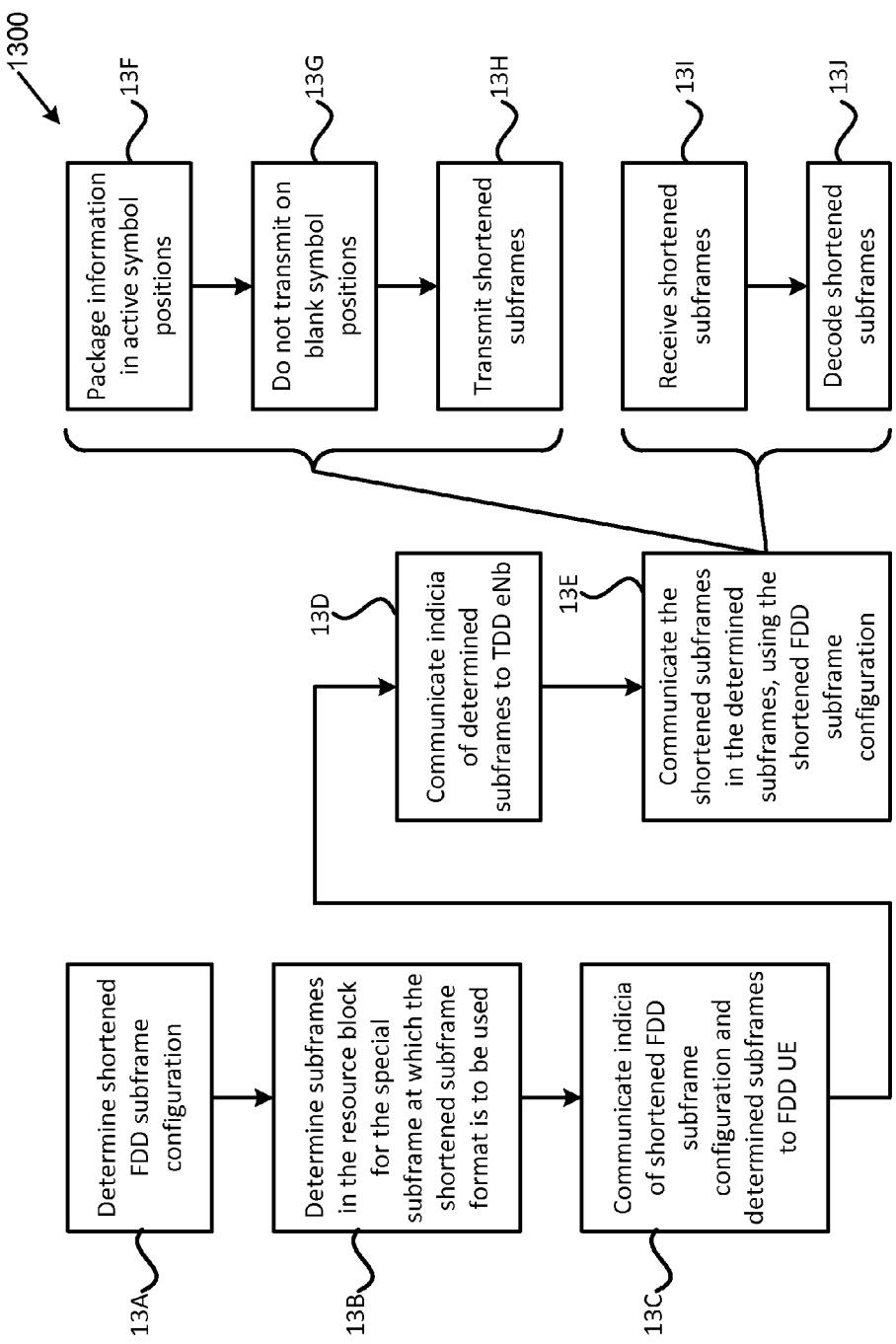
FIG. 13 is a block diagram of a flowchart performed by an FDD eNB in order to provide for shortened subframe format for FDD.

Turning now to FIG. 13, a block diagram is shown of a flowchart 1300 performed by an FDD eNB in order to provide for shortened subframe format for FDD UE. The blocks in flowchart 1300 may arise because of the SSF 12E instructions in the PROG 12C, though a solely hardware implementation (e.g., an integrated circuit), or through some combination thereof. Flowchart 1300 starts in block 13A, where a shortened FDD subframe configuration (e.g., one of the configurations 0-4 shown in FIG. 6) is determined. In block 13B, the subframes are determined in the resource block for the special subframe at which the shortened subframe format is to be used. See FIGS. 8 and 10 for illustrates of shortened subframes communicated at particular subframes in the resource block.

In block 13C, indicia are communicated to the FDD UE of the shortened FDD subframe configuration and determined subframes. In block 13D, indicia of the determined subframes is communicated to TDD eNb, e.g., using a message on the path 15. In block 13E, the shortened subframes are communicated in the determined subframes in TDD CC by TDD eNB, using the shortened FDD subframe configuration.

Block 13E may include transmission by the TDD eNB and reception by the FDD UE. In this case, the TDD eNB packages information in active symbol positions (block 13F), does not transmit on the blank symbol positions (block 13G), and transmits shortened subframes (block 13H) in the determined subframes (that is, transmits active symbols on symbol positions assigned to the active symbols and does not transmit symbols on blank symbol positions). Here, the TDD eNB may be used to transmit a TDD carrier, and an FDD UE, if configured, can access the TDD carrier. So the package may be formed in FDD eNB, but passed to TDD eNB to transmit. It is noted that there could be a super eNB to form the package for both eNBs, if consider a more optimized scheduling algorithm.

Block 13E may include reception by the FDD eNB and transmission by the FDD UE. In this case, the FDD eNB receives shortened subframes on the determined subframes in the resource block of the special subframe (block 13I) (that is, receives active symbols on symbol positions assigned to the active symbols and does not receive symbols on blank symbol positions). Here, the FDD eNB may receive TDD's UpPTS in blanked symbols, and may forward that to TDD eNB. The so called "blank symbols" is meant for FDD UE. The FDD eNB decodes the shortened subframes in block 13J, according to the shortened FDD subframe configuration selected in block 13A.

Figure 14:
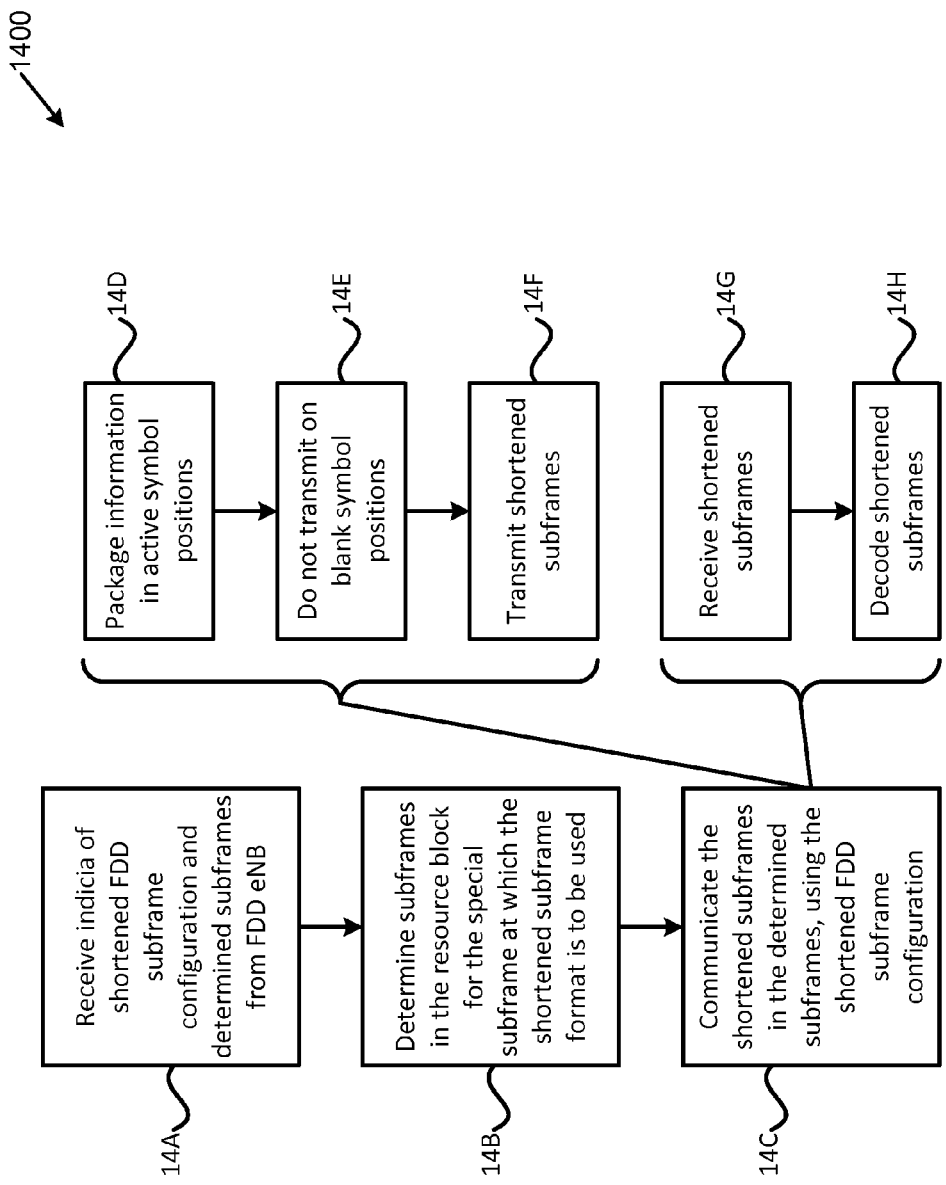
FIG. 14 is a block diagram of a flowchart performed by an FDD UE in order to provide for shortened subframe format for FDD.

FIG. 14 is a block diagram of a flowchart 1400 performed by an FDD UE in order to provide for shortened subframe format for FDD. The blocks in flowchart 1400 may arise because of the SSF 10E instructions in the PROG 10C, though a solely hardware implementation (e.g., an integrated circuit), or through some combination thereof. In block 14A, FDD UE receives the indicia of the shortened FDD subframe configuration and determined subframes. In block 14B, using the indicia, subframes are determined in the resource block for the special subframes at which the shortened subframe format is to be used. In block 14C, the shortened subframes are communicated in the determined subframes, using the shortened FDD subframe configuration.

Block 14C may include transmission by the FDD UE and reception by the FDD eNB. In this case, the FDD UE packages information in active symbol positions (block 14D), does not transmit on the blank symbol positions (block 14E), and transmits shortened subframes (block 14F) in the determined subframes (that is, transmits active symbols on symbol positions assigned to the active symbols and does not transmit symbols on blank symbol positions).

Block 14C may include reception by the FDD UE and transmission by the TDD eNB. In this case, the FDD UE receives shortened subframes on the determined subframes in the resource block of the special subframe (block 14G) (that is, receives active symbols on symbol positions assigned to the active symbols and does not receive symbols on blank symbol positions). The FDD UE decodes the shortened subframes in block 14J, according to the shortened FDD subframe configuration received in block 14A and determined in block 14B. It is noted that the FDD UE should not decode the blank symbols. There may be TDD UE's UpPTS in that duration.

Figure 15:
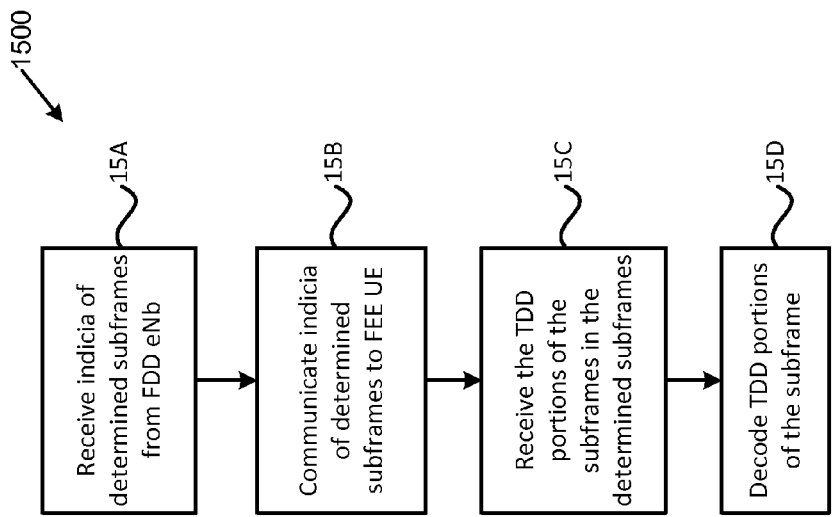
FIG. 15 is a block diagram of a flowchart performed by a TDD eNB in order to provide for shortened subframe format for FDD.

Referring to FIG. 15, a block diagram is shown of a flowchart 1500 performed by a TDD eNB in order to provide for shortened subframe format for FDD. The blocks in flowchart 1500 may arise because of the SSF 12F instructions in the PROG 12C, though a solely hardware implementation (e.g., an integrated circuit), or through some combination thereof. In block 15A, indicia is received from the FDD eNB of determined subframes that will have the shortened subframe format. In block 15B, indicia of determined subframes is communicated to the FDD UE. In block 15C, the TDD portions of the subframes in the determined subframes are received. That is, typically the UpPTS is received from the TDD UE. In block 15D, the TDD portions of the subframes are decoded.

Figure 16:
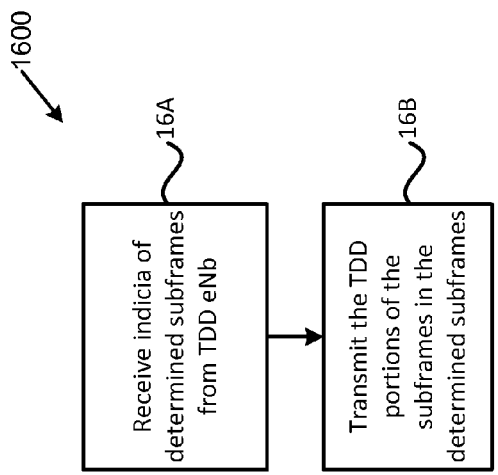
FIG. 16 is a block diagram of a flowchart performed by a TDD UE in order to provide for shortened subframe format for FDD.

Turning to FIG. 16, this figure shows a block diagram of a flowchart 1600 performed by a TDD UE in order to provide for shortened subframe format for FDD. The blocks in flowchart 1600 may arise because of the SSF 10F instructions in the PROG 10C, though a solely hardware implementation (e.g., an integrated circuit), or through some combination thereof. In block 16A, indicia is received from TDD eNb of the determined subframes. In block 16B, the TDD portions of the subframes in the determined subframes are transmitted. This is typically transmissions of the UpPTS in the determined subframes.

It is noted that if the FDD and TDD eNBs are combined, it may be possible to combine flowcharts 1300 and 1500. Furthermore, blocks 13D and 15A may not be necessary.

It should be noted that an exemplary embodiment herein includes computer program product comprising a computer-readable medium bearing computer program code embodied therein for use with a computer, the computer program code comprising: code for determining one of a plurality of subframes in a resource space in which a shortened subframe is to be communicated, each of the subframes having a predetermined number of symbol positions, the resource space comprising the plurality of subframes; and code for communicating the shortened subframe in the determined subframe, the shortened subframe having a plurality of active symbols at first symbol positions in the determined subframe and having a plurality of blanked symbols at second symbol positions in the determined subframe.

As another example, an apparatus could include means for determining one of a plurality of subframes in a resource space in which a shortened subframe is to be communicated, each of the subframes having a predetermined number of symbol positions, the resource space comprising the plurality of subframes; and means for communicating the shortened subframe in the determined subframe, the shortened subframe having a plurality of active symbols at first symbol positions in the determined subframe and having a plurality of blanked symbols at second symbol positions in the determined subframe.

Without in any way limiting the scope, interpretation, or application of the claims appearing below, a technical effect of one or more of the example embodiments disclosed herein is provide shortened FDD downlink or uplink subframes to all for operation of both an FDD UE and a TDD UE within a subframe.

Embodiments of the present invention may be implemented in software, hardware, application logic or a combination of software, hardware and application logic. The software, application logic and/or hardware may reside on the TDD UE, FDD UE, the FDD eNB, or the TDD eNB (or a combination FDD/TDD eNB). In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 1. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

In accordance with an exemplary aspect of the invention there is at least a method, apparatus, and executable computer program to perform actions comprising determining one of a plurality of subframes in a resource space in which a shortened subframe is to be communicated, each of the subframes having a predetermined number of symbol positions, the resource space comprising the plurality of subframes, and communicating the shortened subframe in the determined subframe, the shortened subframe having a plurality of active symbols at first symbol positions in the determined subframe and having a plurality of blanked symbols at second symbol positions in the determined subframe.

Further, in accordance with the paragraph above, the communicating further comprises transmitting the active symbols in the shortened subframe to a first user equipment in a frequency division duplex manner, and not transmitting on one or more of the plurality of the blanked symbols in the shortened subframe.

In addition, in accordance with the paragraph above, the communicating further comprising receiving from a second user equipment active symbols on symbol positions corresponding to one or more of the plurality of the blanked symbols in the shortened subframe of the first user equipment.

Further, in accordance with the paragraph above, the first user equipment in the frequency division duplex manner takes a frequency division duplex component carrier as a primary component carrier and takes a time division duplex component carrier as a secondary component carrier.

In addition, in accordance with the paragraph above, the communicating comprises receiving the active symbols in the shortened subframe from a first user equipment, and on one or more of plurality of the blanked symbols in the shortened subframe of the first user equipment no transmission of the first user equipment.

Further, in accordance with the paragraph above, there is receiving from a second user equipment active symbols on symbol positions corresponding to the one or more of the plurality of the blanked symbols of the first user equipment.

In addition, in accordance with the paragraph above, the second user equipment in a time division duplex manner takes a time division duplex component carrier as a primary component carrier and takes a frequency division duplex component carrier as a second component carrier.

Further, in accordance with the paragraph above, the communicating comprises transmitting the active symbols in the determined subframe, the active symbols corresponding to at least part of guard period symbols for a second base station which is using same frequency, wherein the transmitting causes the base station to receive the active symbols during at least one of the guard period symbols or one or more of the plurality of blanked symbols.

In addition, in accordance with the paragraph above, there is performing one of limiting an allocation of physical resource blocks in the determined subframe or defining a void synchronization resource in the determined subframe.

Furthermore, in accordance with the paragraph above, each of the subframes is a first subframe carried on a subcarrier, wherein the resource space corresponds to a special subframe in a frame comprising the special subframe and a plurality of second subframes, the special subframe and the plurality of second subframes located in different timeslots.

In addition, in accordance with the paragraph above, each resource block of the special subframe covers one or more shortened symbols over time and one or more subcarriers over frequency, wherein at least one user equipment operating in a time division duplex manner or a frequency division duplex manner may be scheduled to receive on one or more of the resource blocks, and wherein other symbols in the special subframe may be used by a user equipment in a time division duplex manner for one a guard period or an uplink pilot time slot.

Further, in accordance with the paragraph above, the special subframe comprises a downlink pilot time slot, a guard period, and an uplink pilot time slot.

In addition, in accordance with the paragraph above there is determining one of a plurality of subframes further comprises determining a plurality of selected subframes in the resource space in which shortened subframes are to be communicated, and communicating the shortened subframe in the determined subframe further comprises communicating the shortened subframes in the determined selected subframes.

In addition, in accordance with any one of the paragraphs above there is a computer program embodied on a non-transitory memory comprising machine readable instructions executed to perform the method as in any one of the preceding claims.

In accordance with an exemplary aspect of the invention there is at least a method, apparatus, and executable computer program to perform actions comprising receiving a shortened subframe in a determined subframe, the shortened subframe having a plurality of active symbols at first symbol positions in a determined subframe and having a plurality of blanked symbols at second symbol positions in the determined subframe, and decoding the active symbols based on the received shortened subframe having the plurality of active symbols at the first symbol positions and having the plurality of blanked symbols at the second symbol positions.

Further in accordance with the paragraph above, there is transmitting one or more of the plurality of active symbols on symbol positions corresponding to one or more of the plurality of blanked symbols in the shortened subframe.

Further in accordance with the paragraph above, there is transmitting, to a base station, the active symbols in the determined subframe, the active symbols corresponding to at least part of guard period symbols for the second base station.

In accordance with the paragraphs above, the transmitting works on one of time division duplex or frequency division duplex.

Further, there is at least a method in accordance with the paragraph above performed by a mobile communication device Although various aspects of the invention are set out in the independent claims, other aspects of the invention comprise other combinations of features from the described embodiments and/or the dependent claims with the features of the independent claims, and not solely the combinations explicitly set out above or in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising:
   determining one of a plurality of subframes in a resource space in which a shortened subframe is to be communicated, each of the subframes having a predetermined number of symbol positions, the resource space comprising the plurality of subframes;
   communicating the shortened subframe in the determined subframe to a first user equipment in a frequency division duplex manner, the shortened subframe having a plurality of active symbols at first symbol positions in the determined subframe and having a plurality of blanked symbols at second symbol positions in the determined subframe, wherein the first user equipment in the frequency division duplex manner takes a time division duplex component carrier as a secondary component carrier of the first user equipment; and
   receiving from a second user equipment the active symbols corresponding to one or more of the plurality of the blanked symbols of the first user equipment, wherein the second user equipment in a time division duplex manner takes a frequency division duplex component carrier as a second component carrier of the second user equipment.

2. The method of claim 1, wherein the communicating further comprises transmitting the active symbols in the shortened subframe to the first user equipment in the frequency division duplex manner, and not transmitting on any of the blanked symbols in the shortened subframe.

3. The method of claim 1, wherein the communicating comprises receiving the active symbols in the shortened subframe from the first user equipment, and on one or more of the plurality of the blanked symbols in the shortened subframe of the first user equipment no transmission of the first user equipment.

4. A non-transitory machine readable medium comprising memory and a computer program which, when executed, perform the method of claim 1.

5. An apparatus, comprising:
   at least one processor; and
   at least one memory including computer program code,
   the at least one memory and the computer program code configured to, with the at least one processor, cause the apparatus to at least:
   determine one of a plurality of subframes in a resource space in which a shortened subframe is to be communicated, each of the subframes having a predetermined number of symbol positions, the resource space comprising the plurality of subframes;
   communicate the shortened subframe in the determined subframe to a first user equipment in a frequency division duplex manner, the shortened subframe having a plurality of active symbols at first symbol positions in the determined subframe and having a plurality of blanked symbols at second symbol positions in the determined subframe, wherein the first user equipment in the frequency division duplex manner takes a time division duplex component carrier as a secondary component carrier of the first user equipment; and receive from a second user equipment the active symbols corresponding to one or more of the plurality of the blanked symbols of the first user equipment, wherein the second user equipment in a time division duplex manner takes a frequency division duplex component carrier as a second component carrier of the second user equipment.

6. The apparatus of claim 5, wherein the communicating comprises transmitting the active symbols in the shortened subframe to the first user equipment in the frequency division duplex manner, and not transmitting on any of the blanked symbols in the shortened subframe.

7. The apparatus of claim 6, further comprising the at least one memory including the computer program code is configured, with the at least one processor to cause the apparatus to receive from the second user equipment the active symbols on symbol positions corresponding to one or more of the plurality of the blanked symbols in the shortened subframe of the first user equipment.

8. The apparatus of claim 6, wherein the first user equipment in the frequency division duplex manner takes a frequency division duplex component carrier as a primary component carrier and takes the time division duplex component carrier as the secondary component carrier.

9. The apparatus of claim 5, further comprising the at least one memory including the computer program code is configured, with the at least one processor to cause the apparatus to receive the active symbols in the shortened subframe from the first user equipment, and on the one or more of the plurality of the blanked symbols in the shortened subframe of the first user equipment no transmission of the first user equipment.

10. The apparatus of claim 9, further comprising the at least one memory including the computer program code is configured, with the at least one processor to cause the apparatus to receive from the second user equipment the active symbols on symbol positions corresponding to the one or more of the plurality of the blanked symbols of the first user equipment.

11. The apparatus of claim 10, wherein the second user equipment in the time division duplex manner takes a time division duplex component carrier as a primary component carrier and takes the frequency division duplex component carrier as the second component carrier.

12. The apparatus of claim 5, wherein the communicating comprises transmitting the active symbols in the determined subframe, the active symbols corresponding to at least guard period symbols for a second base station which is using same frequency, wherein the transmitting causes the base station to receive active symbols during the blanked symbols.

13. The apparatus of claim 5, wherein communicating comprises one of limiting an allocation of physical resource blocks in the determined subframe or defining a void synchronization resource in the determined subframe.

14. The apparatus of claim 5, wherein each of the subframes is a first subframe carried on subcarrier, and wherein the resource space corresponds to a special subframe in a frame comprising the special subframe and a plurality of second subframes, the special subframe and the plurality of second subframes located in different timeslots.

15. The apparatus of claim 14, wherein each resource block of the special subframe covers one or more shortened symbols over time and one or more subcarriers over frequency, wherein at least one user equipment operating in a time division duplex manner or a frequency division duplex manner may be scheduled to receive on one or more of the resource blocks, and wherein other symbols in the special subframe may be used by a user equipment in a time division duplex manner for one a guard period or an uplink pilot time slot.

16. A method comprising:
receiving at a first user equipment in a frequency division duplex manner a shortened subframe in a determined subframe, the shortened subframe having a plurality of active symbols at first symbol positions in a determined subframe and having a plurality of blanked symbols at second symbol positions in the determined subframe;
decoding time division duplex portions comprising the active symbols based on the received shortened subframe having the plurality of active symbols at the first symbol positions and having the plurality of blanked symbols at the second symbol positions, wherein the first user equipment in the frequency division duplex manner takes a time division duplex component carrier as a secondary component carrier of the first user equipment; and
transmitting by a second user equipment the active symbols corresponding to one or more of the plurality of the blanked symbols of the first user equipment, wherein the second user equipment in a time division duplex manner takes a frequency division duplex component carrier as a second component carrier of the second user equipment.

17. An apparatus comprising:
at least one processor; and
at least one memory including computer program code, the at least one memory and the computer program code configured to, with the at least one processor, cause the apparatus to:
receive at a first user equipment in a frequency division duplex manner a shortened subframe in a determined subframe, the shortened subframe having a plurality of active symbols at first symbol positions in a determined subframe and having a plurality of blanked symbols at second symbol positions in the determined subframe;
decode time division duplex portions comprising the active symbols based on the received shortened subframe having the plurality of active symbols at the first symbol positions and having the plurality of blanked symbols at the second symbol positions, wherein the first user equipment in the frequency division duplex manner takes a time division duplex component carrier as a secondary component carrier of the first user equipment; and
transmitting by a second user equipment the active symbols corresponding to one or more of the plurality of the blanked symbols of the first user equipment, wherein the second user equipment in a time division duplex manner takes a frequency division duplex component carrier as a second component carrier of the second user equipment.

18. The apparatus of claim 17, further comprising the at least one memory including the computer program code is configured, with the at least one processor to cause the apparatus to transmit the active symbols on symbol positions corresponding to one or more of the plurality of blanked symbols in the shortened subframe.

19. The apparatus of claim 17, further comprising the at least one memory including the computer program code is configured, with the at least one processor to cause the apparatus to transmit, to a base station, one or more of the active symbols in the determined subframe, the active symbols corresponding to at least guard period symbols for the base station.

* * * * *